United States Patent [19]

Ohta et al.

[11] Patent Number: 4,761,995
[45] Date of Patent: Aug. 9, 1988

[54] DIRECT-HEATED FLOW MEASURING APPARATUS HAVING IMPROVED SENSITIVITY AND RESPONSE SPEED

[75] Inventors: Minoru Ohta, Okazaki; Kazuhiko Miura, Nukata; Michitoshi Onoda, Toyohashi; Tadashi Hattori, Okazaki, all of Japan

[73] Assignee: Nippon Soken, Inc., Nishio, Japan

[21] Appl. No.: 46,938

[22] Filed: May 5, 1987

[30] Foreign Application Priority Data

May 9, 1986 [JP] Japan ................... 61-107233

[51] Int. Cl.$^4$ ............................................. G01M 15/00
[52] U.S. Cl. ...................................... 73/118.2; 73/204
[58] Field of Search ............... 73/118.2, 204; 123/494

[56] References Cited

U.S. PATENT DOCUMENTS

| 4,196,622 | 4/1980 | Peter ........................................ 73/204 |
| 4,283,944 | 8/1981 | Gruner et al. .......................... 73/204 |
| 4,627,279 | 12/1986 | Ohta et al. .............................. 73/195 |
| 4,688,425 | 8/1987 | Kanehara et al. ..................... 73/204 |
| 4,693,115 | 9/1987 | Tokura et al. ......................... 73/204 |
| 4,705,713 | 11/1987 | Ohta et al. ............................ 428/209 |

FOREIGN PATENT DOCUMENTS 54-76182  6/1979  Japan .
230019  11/1985  Japan .................... 73/204

Primary Examiner—Jerry W. Myracle
Attorney, Agent, or Firm—Cushman, Darby & Cushman

[57] ABSTRACT

In a direct-heated flow measuring apparatus including a thin-plate sensing element supported by a supporting member in a passage, a sensing portion for generating heat and detecting the temperature thereof is positioned on the downstream side of the sensing element with respect to a fluid stream.

20 Claims, 7 Drawing Sheets

DIRECT-HEATED FLOW MEASURING APPARATUS HAVING IMPROVED SENSITIVITY AND RESPONSE SPEED

BACKGROUND OF THE INVENTION

1. Field of the Invention

The present invention relates to a direct-heated flow measuring apparatus having a film resistor which serves as a temperature detecting means as well as an electric heater. Such a direct-heated flow measuring apparatus can be used, for example, for measuring the flow rate of engine intake air.

2. Description of the Related Art

Generally, in an internal combustion engine, the amount of intake air is one of the most important parameters for controlling the fuel injection amount, ignition timing, and the like. A flow measuring apparatus, i.e., an airflow meter, is provided for measuring the same. One of the more common prior art airflow meters is the vane-type, but this is disadvantageous in scale, response speed characteristics, and the like, and therefore, airflow meters having temperature-dependent resistors have been developed, in which these disadvantages of scale, response speed characteristics, and the like are avoided (see: U.S. Pat. No. 3,975,951).

There are two types of airflow meters having temperature-dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor (see: U.S. Pat. No. 3,957,951). In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled to provide a constant difference in temperature between the two temperature-dependent resistors, and thus the mass flow rate of air is determined by detecting the voltage applied to the heater resistor.

In this heater-type airflow meter, if an upstream temperature-dependent resistor is not provided and the current of the heater resistor is controlled to provide a constant temperature of the downstream temperature-dependent resistor, the voltage applied to the heater resistor is detected as representing the volume flow rate of air.

On the other hand, the direct-heated type airflow meter may consist of a film resistor (i.e., a sensing element) which serves not only as an electric heater, but also as a temperature-detecting means for detecting the temperature of the heated air (U.S. Pat. Nos. 3,747,577 and 4,279,146). Also, the direct-heated type airflow meter may consist of a temperature-dependent resistor for detecting the temperature of non-heated air. Thus, the current flowing through the film resistor is controlled to provide a constant difference in temperature between the film resistor and the temperature dependent resistor, thereby detecting the voltage applied to the film resistor as representing the mass flow rate of air. In this direct-heated type airflow meter, too, if a temperature-dependent resistor is not provided and the current of the heater resistor is controlled to provide a constant temperature of the film resistor, the voltage applied to the film resistor is detected as representing the volume flow rate of air.

Since the film resistor of the direct-heated type airflow meter serves as a temperature-detecting means for heated air, that is, an additional temperature detecting means for heated air is not necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a resistance layer of platinum (Pt), gold (Au), etc. on the insulating substrate, and a heat-resistant resin on the resistance pattern. Here, it is impossible to burn off suspended particles (mainly, carbon particles) adhered to the boundary region and the stagnation region of the film resistor, since a temperature higher than 800° C. is required for such burn-off and the heat-resistant resin has a low melting temperature such as 400° C. Therefore, the suspended particles remain adhered to the film resistor, increasing the heat capacity and reducing the heat dissipation characteristics thereof, and therefore, reducing the sensitivity and response speed characteristics of the airflow meter. Also, where a heat-resistant resin is not provided for covering the film resistor, which is, in this case, made of heat-resistant platinum, when such a burn-off is often carried out, the film resistor is exposed to a temperature higher than 800° C., so that the resistance characteristics of the film resistor are changed, thus inviting a drift in the output of the airflow meter. In this case, it is impossible to accurately carry out a flow measurement.

Further, when a heat-resistant platinum layer is formed on a ceramic substrate or a semiconductor substrate, and such a burn-off is carried out, distortions occur between the platinum layer and the substrate, thus changing the resistance characteristics of the platinum layer.

Further, to carry out a burn-off, an additional burn-off circuit is provided, thus increasing the cost of the airflow meter (see U.S. Pat. No. 4,196,622).

SUMMARY OF THE INVENTION

It is an object of the present invention to provide a direct-heated flow measuring apparatus maintaining the necessary sensitivity and response characteristics by suppressing the adhesion of suspended particles to the film resistor, particularly, the sensing portion thereof.

According to the present invention, in a direct-heated flow measuring apparatus including a sensing element (film resistor) supported by a supporting member in a passage, a sensing portion for generating heat and detecting the temperature thereof is provided on the downstream side of the sensing element. As a result, the adhesion of suspended particles to the sensing portion of the sensing element can be avoided or suppressed.

BRIEF DESCRIPTION OF THE DRAWINGS

The present invention will be more clearly understood from the description as set forth below with reference to the accompanying drawing, wherein.

DESCRIPTION OF THE PREFERRED EMBODIMENTS

Figure 1:
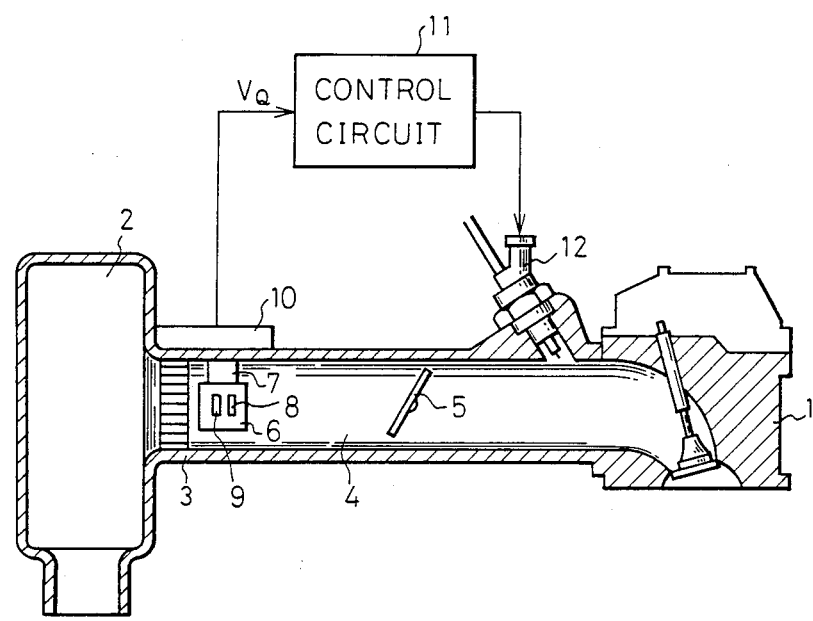
FIG. 1 is a schematic diagram showing the overall configuration of an internal combustion engine including a first embodiment of the direct-heated flow measuring apparatus according to the present invention.

In FIG. 1, which illustrates the overall configuration of an internal combustion engine including an air flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The flow measuring apparatus is provided in the intake air passage 4 between the rectifier grid 3 and the throttle valve 5.

The flow measuring apparatus includes a sensing portion inside of the intake air passage 4 and a sensing circuit 10 outside of the intake air passage 4. The sensing portion includes a measuring tube (or duct) 6 fixed by a stay 7 to the intake air passage 4. A sensing element (film resistance pattern) 8 and a temperature-compensating element 9 for detecting the temperature of non-heated air are both provided inside of the duct 6. However, the temperature-compensating element 9 is substantially unaffected by the heat generated from the sensing element 8. The sensing element 8 and the temperature-compensating element 9 are connected to the sensing circuit 10 mounted on a hybrid board.

The sensing circuit 10 controls the current flowing to the sensing element 8 to generate heat for a constant difference in temperature between the sensing element 8 and the temperature-compensating element 9. Also, the sensing circuit 10 generates an output voltage $V_Q$ and transmits it to a control circuit 11, which includes, for example, a microcomputer. The control circuit 11 also receives various kinds of detecting signals such as an engine speed signal Ne (not shown) and an engine coolant temperature signal THW (not shown) and controls the valve opening time period of a fuel injection valve 12 and the like.

Figure 2:
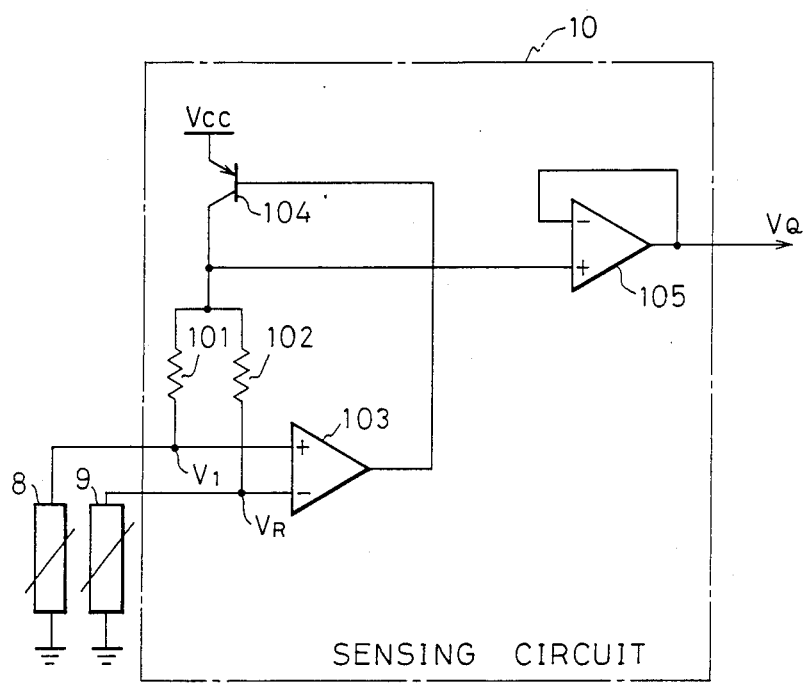
FIG. 2 is a circuit diagram of the sensing circuit of FIG. 1.

The sensing circuit 10 of FIG. 1 will be explained with reference to FIG. 2. In FIG. 2, the sensing circuit 10 includes resistors 101 and 102 which form a bridge circuit with the sensing element 8 and the temperature-compensating element 9; a comparator 103; a transistor 104 controlled by the comparator 103; and a voltage buffer 105. The sensing circuit 10 operates as follows. When the amount of air flowing through the intake air passage 4 increases, thus reducing the temperature of the sensing element 8, which is, in this case, a resistance element such as a platinum resistance having a positive temperature coefficient, the resistance value thereof decreases so as to satisfy the following condition:

$$V_1 < V_R$$

where $V_1$ is the potential at the node between the resistor 101 and the sensing element 8 and $V_R$ is the potential at the node between the resistor 102 and the temperature-compensating element 9. As a result, the output potential of the comparator 103 is reduced, thereby increasing the conductivity of the transistor 104. Therefore, the heat generated by the sensing element 8 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the sensing element 8, the resistance value thereof increases so as to satisfy the following condition:

$$V_1 \geq V_R.$$

As a result, the output potential of the comparator 103 is increased, thereby decreasing the conductivity of the transistor 104. Therefore, the heat generated by the sensing element 8 is decreased and, simultaneously, the collector potential of the transistor 104 is decreased, so that the output voltage $V_Q$ of the voltage buffer 105 is also decreased.

Thus, feedback control is performed upon the temperature of the sensing element 8 for a constant difference in temperature between the sensing element 8 and the temperature-compensating element 9, which, in this case, detects the temperature of ambient air. Thus, the output voltage $V_Q$ of the output buffer 105 indicates the amount of air flowing through the intake air passage 4.

Figure 3:
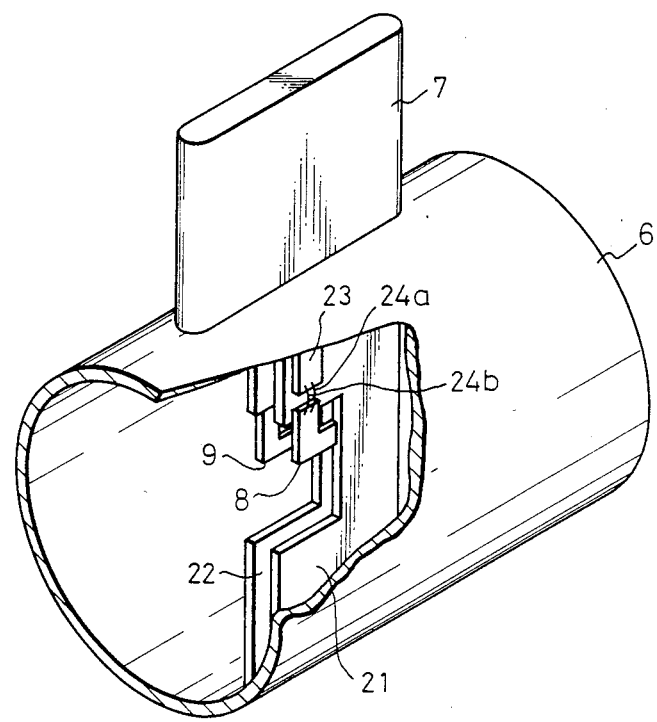
FIG. 3 is a partially cutaway, perspective view of the direct-heated flow measuring apparatus of FIG. 1.

In FIG. 3, which is a partially cutaway, perspective view of the direct-heated flow measuring apparatus of FIG. 1, the sensing element 8 and the temperature-compensating element 9 are fixed to supporting members 21 and 22, respectively, arranged in parallel with respect to the air stream. That is, the thickness portions of sensing element 8 and the temperature-compensating element 9 are opposed to the air stream.

Note that, in order to make the transient temperature characteristics of the system of the sensing element 8 conform with those of the system of the temperature-compensating element 9, the sensing element 8 and the temperature-compensating element 9 are of the same substrate material, the same heat capacity, and the same dimension, and are fixed by the same method with adiabatic material (not shown) to the supporting members 21 and 22 which are the same as each other.

Also, note that, if the transient temperature characteristics of the system of the sensing element 8 are different from those of the system of the temperature-compensating element 9, the balance of the bridge circuit of FIG. 2 is destroyed, thereby generating an error in the detection of a measured flow rate.

Further, in FIG. 3, since the sensing element 8 and the temperature-compensating element 9 are provided on separate substrates and are apart from each other, the heat amount generated by the sensing element 8 has little affect on the temperature-compensating element 9.

Figure 4:
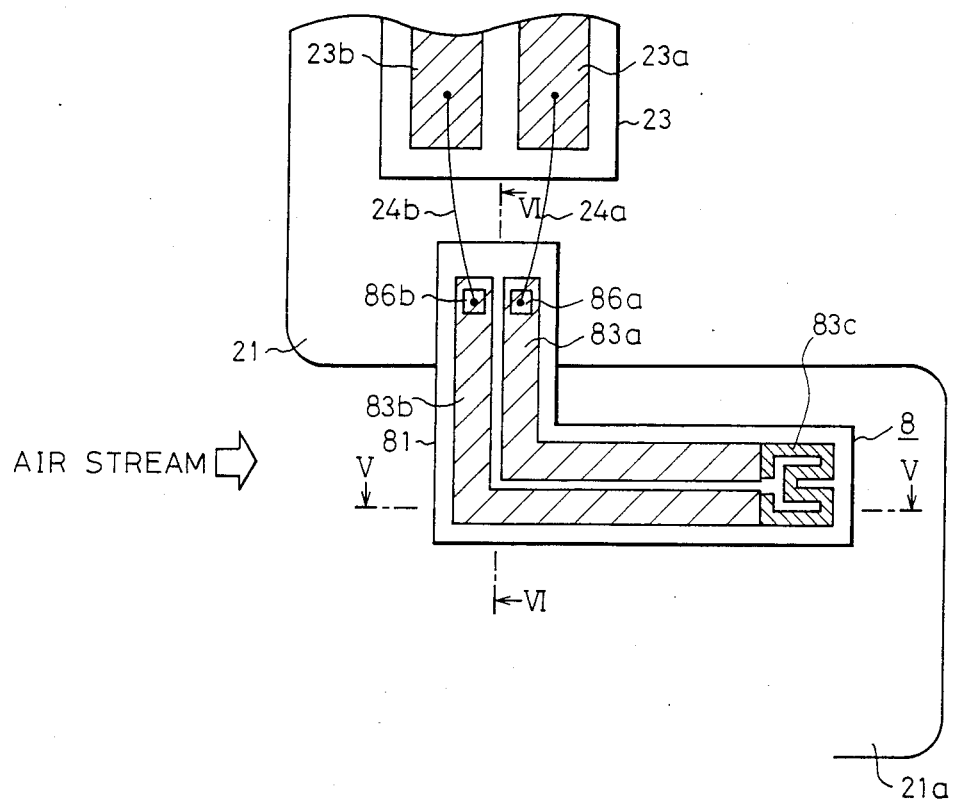
FIG. 4 is a plan view of the sensing element of FIG. 3.
Figure 5:
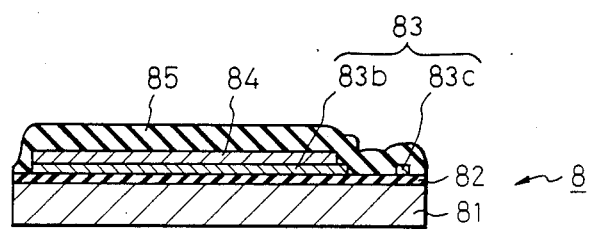
FIGS. 5 and 6 are cross-sectional views taken along the lines V—V and VI—VI, respectively, of FIG. 4.

As shown in FIG. 4, which illustrates the sensing element 8 of FIG. 3, the element 8 has an approximate "L"-shape. Also, as shown in FIG. 5, which is a cross-sectional view along the lines V—V of FIG. 4, the sensing element 8 comprises a semiconductor substrate 81 made of such as monocrystalline silicon about 200 to 400 μm in thickness having an insulating layer 82 thereon which is made of silicon dioxide ($SiO_2$) obtained by thermal oxidization of the substrate 81. Also, platinum (Pt) is deposited by evaporation or sputtering on the insulating layer 82, and is then etched by the wet or dry method to obtain a film resistance pattern 83. In this case, the resistance value of the resistance pattern 83 is variable in accordance with the width thereof. That is, the width at portions 83a and 83b (also see FIG. 4) is relatively large, so that these portions 83a and 83b serve as conductor portions. On the other hand, the width at a portion 83c is relatively small, so that this portion 83c serves as a sensing portion for generating heat and detecting the temperature thereof. Also, formed on the conductor portions 83a and 83b are heat-resistant resistance patterns 84 of high conductivity such as gold (Au) for reducing the heat generated from the portions 83a and 83b. Further, a passivation layer 85 such as silicon dioxide ($SiO_2$) or silicon nitride ($Si_3N_4$) is formed to cover the entire Pt and Au patterns 83 and 84.

In FIG. 4, note that reference numerals 86a and 86b are pads provided on the conductor portions 83a and 83b for connecting them via bonding wires 24a and 24b to leads 23a and 23b, respectively, which are formed via an insulating layer 23 on the supporting member 23. In this case, the leads 23a and 23b are formed by printing or the like.

Figure 6:
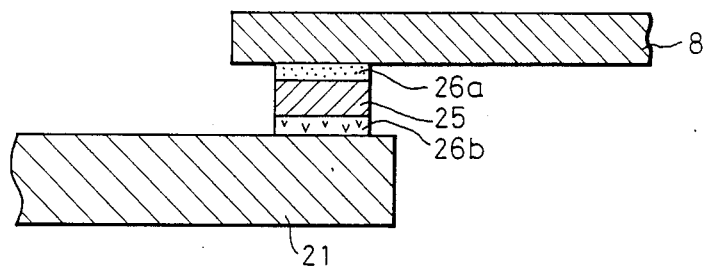

As shown in FIG. 6, the sensing element 8 is fixed via an adiabatic member 25 to the supporting member 21. In this case, heat-resistant adhesives 26a and 26b are coated on both surfaces of the adiabatic member 25, and the adiabatic member 25 and the heat-resistant adhesives 26a and 26b serve as heat transfer throttling portions for the sensing element 8. The adiabatic member 25 is made of material having a small specific heat and a small heat conductivity, such as ceramic, polyimid resin, mullite, zirconia, quartz, or $SiO_2$ glass, and accordingly, also serves as an electrically insulating member. Further, the supporting member 21 is made of a metal such as aluminium, copper, or molybdenum having a large thermal conductivity and a small specific heat. Therefore, the heat transmitted from the sensing element 8 via the adiabatic member 25 as the heat transfer throttling portion to the supporting member 21 is promptly dissipated to the air stream. That is, most of the heat generated by the sensing element 8 is dissipated from the sensing element 8 itself due to the presence of the adiabatic member 25, and one part of the heat is transmitted via the adiabatic member 25 to the supporting member 21. However, this part is also dissipated into the air stream. Therefore, heat transmitted via the duct 6 and the stay 7 to portions other than the air stream is remarkably reduced.

Returning to FIG. 4, the conductor portions 83a and 83b are also "L"-shaped. Also, the sensing portion 83c as positioned on an end of the substrate 81, and the pads 86a and 86b are positioned on another end of the substrate 81. Thus, the sensing portion 83c is positioned on the most downstream side of the sensing element 8 with respect to the air stream. In addition, the sensing element 8 is positioned on the supporting member 21 in such a manner that the sensing portion 83c is positioned on the downstream side of the connection portion between the supporting member 21 and the sensing element 8 with respect to the air stream.

Also provided in the supporting member 21 is a recess 21a at which the sensing portion 81c of the sensing element 81 is positioned. As a result, fluctuations in the air stream near the sensing element 8 can be avoided.

In FIG. 4, although suspended particles in the air stream are easily adhered to an upstream-side edge of the sensing element 8, few suspended particles are adhered to the sensing element 8 due to the parallel arrangement thereof with respect to the air stream. Further, since the sensing portion 83c of the sensing element 8 is positioned on the most downstream-side of the L-shaped element 8, the adhesion of suspended particles to the sensing portion 83c is further suppressed, so that the heat dissipation characteristics of the sensing portion 83c are little affected.

Also, a distance remains between the upstream-side edge of the sensing element 8 and the sensing portion 83c, and the resistance values of the conductor portions 83a and 83b, and the resistance pattern 84 are relatively small, so that the heat generated therefrom is very small. Therefore, the heat maintained at the upstream-side edge of the sensing element 8 is the heat transmitted via the substrate 81 and the like from the sensing portion 83c. This heat, however, is small compared with the heat dissipated from the sensing portion 83c to the air stream. As a result, the heat dissipation amount from the upstream-side edge of the sensing element 8 to the air stream due to the suspended particles adhered thereto is very small compared with the heat dissipation amount from the entire sensing element 8, thereby suppressing the change of the heat dissipation characteristics of the entire sensing element 8 due to the suspended particles adhered thereto.

Note that, in the first embodiment, although the upstream-side edge of the substrate 81 of the sensing element 8 has a face perpendicular to the air stream, this edge can be tapered or streamlined, thereby suppressing the adhesion of suspended particles thereto.

Figure 7:
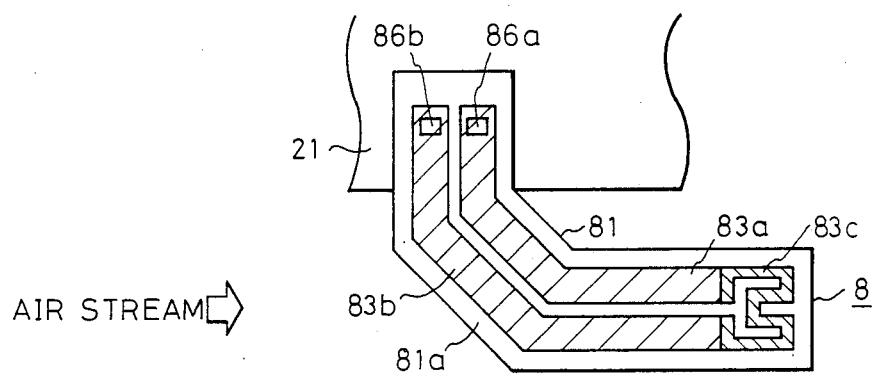
FIGS. 7, 8, and 9 are plan views illustrating second, third, and fourth embodiments of the direct-heated flow measuring apparatus according to the present invention.

In FIG. 7, which illustrates a second embodiment of the present invention, the substrate 81 is bent at two portions. That is, an intersection portion 81a between a first leg portion supported by the supporting member 21 and a second leg portion at which the sensing portion 83c is formed is sloped with respect to the air stream. Namely, the edge of the intersection portion 81a is at an angle of 45° with respect to the air stream. According to the second embodiment as illustrated in FIG. 7, little stagnation of the air stream occurs near the upstream-side edge of the intersection portion 81a, thereby further suppressing the adhesion of suspended particles to the entire sensing element 8.

Figure 8:
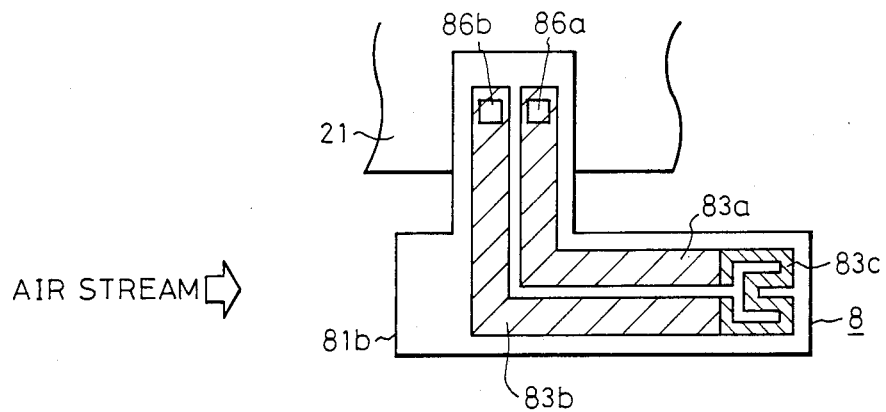

In FIG. 8, which illustrates a third embodiment of the present invention, a protrusion 81b is added to the substrate 81 of FIG. 4. The protrusion 81b is opposed to the second leg portion of the sensing element 8 and is protruded toward the upstream side with respect to the fluid flow. Also, the protrusion 81b has the same width as the second leg portion of the sensing element 8. As a result, since suspended particles are adhered to an upstream-side edge of the protrusion 81b, the distance between the portion to which the suspended particles are adhered and the sensing portion 83c of the sensing element 8 is enlarged, thereby further suppressing the change of the heat dissipation characteristics of the entire sensing element 8.

In FIG. 8, note that the length of the protrusion 81b, and the distance between the upstream-side edge of the protrusion 81b and the sensing portion 83c are determined in view of the heat dissipation characteristics, the detection characteristics, particularly, the dynamic range of the airflow sensor, and the like. That is, in order to suppress the change of the heat dissipation characteristics, the length of the protrusion 81b and the distance between the upstream-side edge of the protrusion 81b and the sensing portion 83c should all be large. On the other hand, in order to increase the dynamic range, the mass of the sensing element 8 should be small, and accordingly, both the length of the protrusion 81b and the distance between the upstream-side edge of the protrusion 81b and the sensing portion 83c should be small. Therefore, these lengths and distances are determined in view of the balance of the heat dissipation characteristics and the dynamic range of the airflow meter.

Figure 9:
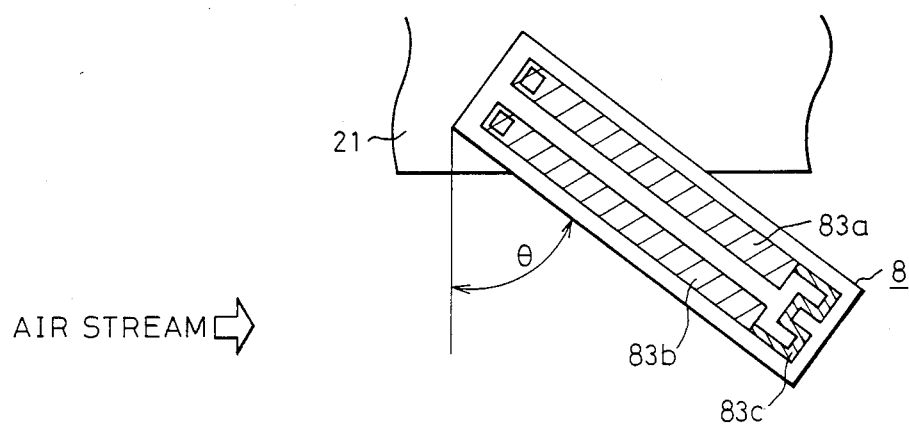

In FIG. 9, which illustrates a fourth embodiment of the present invention, the sensing element 8 is rectangular and is sloped with respect to the fluid flow. In this case, the portion in which the sensing portion 83c is formed is positioned on the downstream side with respect to the fluid flow. As a result, the upstream-side edge of the sensing element 8 opposing the fluid flow is sloped, so that a generation of stagnation near the upstream-side edge of the sensing element 8 can be avoided. Thus, adhesion of suspended particles to the sensing element 8 also can be avoided.

Note that the angle $\theta$ of the sensing element 8 with respect to a face perpendicular to the fluid flow is large enough to exhibit a sufficient adhesion preventing effect for suspended particles. However, this angle $\theta$ is too large to invite a reduction of sensitivity due to the fluctuation of the air stream at the portion of the sensing element 8 (particularly, the adiabatic member 25) fixed to the supporting member 5. According to the findings of the inventors, this angle $\theta$ is preferably 30° to 80°, particularly, 50° to 70°. In other words, the angle of the sensing element 8 with respect to the fluid flow is preferably 10° to 60°, particularly, 20° to 40°.

Note that the above-mentioned conductor portions 83a and 83b, and the sensing portion 83c of the sensing element 8 can be also obtained by diffusing impurities into the substrate 81 which is made of, for example, monocrystalline silicon.

Also, the present invention can be applied to flow rate sensors other than airflow meters, such as liquid flow rate sensors. Further, the present invention can be applied to a digital (pulse) type flow sensor controlled by a trigger pulse. That is, in this sensor, when such a trigger pulse is given to initiate heating of a heater resistor, then the heating of the sensing element continues until a constant difference in temperature between the sensing element and the temperature compensating element is generated, or until the sensing element reaches a constant value. In this case, the heating time period is detected as the mass flow rate of air or the volume flow rate of air. Such a trigger pulse control has an advantage in that the power dissipation is good. Note that such a trigger pulse control is possible in a direct-heated flow rate sensor.

As explained above, according to the present invention, the adhesion of suspended particles can be avoided or reduced, thereby improving the sensitivity and response speed of the sensor.

We claim:

1. A direct-heated flow measuring apparatus for measuring a flow rate of a fluid stream within a passage comprising:
    a thin-plate sensing element disposed in parallel with said fluid stream within said passage and having a sensing portion for generating heat and detecting the temperature thereof;
    a supporting member for supporting said sensing element in said passage at at least one end of said sensing element; and
    electric power control means, connected to said sensing portion of said sensing element, for controlling the heat generated therefrom,
    said sensing portion being positioned on a downstream side of a connection portion between said sensing element and said supporting member with respect to said fluid stream within said passage, and said sensing element is approximately L-shaped having a first portion fixed to said supporting member and a second portion positioned on a downstream side with respect to said fluid stream, said portion being formed on said second portion.

2. An apparatus as set forth in claim 1, wherein an intersectron portion on said sensing element between said first and second portions is sloped with respect to said fluid stream.

3. An apparatus as set forth in claim 2, wherein the angle between said intersection portion and said fluid stream is substantially 45°.

4. An apparatus as set forth in claim 1, wherein said sensing element further comprises a third portion opposed to said second portion and protruded toward the upstream side with respect to said fluid stream.

5. An apparatus as set forth in claim 4, wherein said third portion has the same width as said second portion.

6. A direct-heated flow measuring apparatus for measuring a flow rate of a fluid stream within a passage comprising:
    a thin-plate sensing element which is rectangular and sloped with respect to said fluid stream, said sensing element being disposed in parallel with said fluid stream within said passage and having a sensing portion for generating heat and detecting the temperature thereof;
    a supporting member for supporting said sensing element in said passage at at least one end of said sensing element; and
    electric power control means, connected to said sensing portion of said sensing element, for controlling the heat generated therefrom,
    said sensing portion being positioned on a downstream side of a connection portion between said sensing element and said supporting member with respect to a fluid stream within said passage.

7. An apparatus as set forth in claim 6, wherein an angle between said sensing element and said fluid stream is substantially 10° to 60°.

8. An apparatus as set forth in claim 7, wherein said angle is substantially 20° to 40°.

9. An apparatus as set forth in claim 6, wherein said sensing element comprises:
    a substrate;
    a resistance layer formed on said substrate; and
    a passivation layer, formed on said substrate, for covering said resistance layer.

10. A direct-heated flow measuring apparatus for measuring a flow rate of a fluid stream within a passage comprising:
    a thin-plate sensing element, comprising:
        (a) a semiconductor substrate;
        (b) a diffusion region formed within said semiconductor substrate; and
        (c) a passivation layer, formed on said semiconductor substrate, for covering said semiconductor substrate, said sensing element being disposed in parallel with said fluid stream within said passage and having a sensing portion for generating heat and detecting a temperature thereof;

a supporting member for supporting said sensing element in said passage at at least one end of said sensing element; and electric power control means, connected to said sensing portion of said sensing element, for controlling the heat generated therefrom, said sensing portion being positioned on the downstream side of a connection portion between said sensing element and said supporting member with respect to a fluid stream within said passage.

11. A direct-heated flow measuring a flow rate of a fluid stream within a passage comprising:

a thin-plate sensing element disposed in parallel with said fluid stream within said passage and having a sensing portion for generating heat and detecting the temperature thereof, said sensing portion being positioned on a most downstream-side portion of said sensing element with respect to the fluid stream within said passage;

a supporting member for supporting said sensing element in said passage at at least one end of said sensing element; and electric power control means, connected to said sensing portion of said sensing element, for controlling the heat generated therefrom, wherein said sensing element is approximately L-shaped having a first portion fixed to said supporting member and a second portion positioned on the downstream side with respect to said fluid stream, said portion being formed on said second portion.

12. An apparatus as set forth in claim 11, wherein an intersection portion on said sensing element between said first and second portions is sloped with respect to said fluid stream.

13. An apparatus as set forth in claim 12, wherein the angle between said intersection portion and said fluid stream is substantially 45°.

14. An apparatus as set forth in claim 11, wherein said sensing element further comprises a third portion opposed to said second portion and protruded toward the upstream side with respect to said fluid flow.

15. An apparatus as set forth in claim 14, wherein said third portion has the same width as said second portion.

16. A direct-heated flow measuring apparatus for measuring a flow rate of a fluid stream within a passage comprising:

a thin-plate sensing element which is rectangular and sloped with respect to said fluid stream, said sensing element being disposed in parallel with said fluid stream within said passage and having a sensing portion for generating heat and detecting the temperature thereof, said sensing portion being positioned on a most downstream-side portion of said sensing element with respect to the fluid stream within said passage;

a supporting member for supporting said sensing element in said passage at at least one end of said sensing element; and electric power control means, connected to said sensing portion of said sensing element, for controlling the heat generated therefrom.

17. An apparatus as set forth in claim 16, wherein an angle between said sensing element and said fluid stream is substantially 10° to 60°.

18. An apparatus as set forth in claim 17, wherein said angle is substantially 20° to 40°.

19. An apparatus as set forth in claim 16, wherein said sensing element comprises:

a substrate;

a resistance layer formed on said substrate; and a passivation layer, formed on said substrate, for covering said resistance layer.

20. A direct-heated flow measuring apparatus for measuring a flow rate of a fluid stream within a passage comprising:

a thin-plate sensing element which comprises:

a semiconductor substrate;

a diffusion region formed within said semiconductor substrate; and a passivation layer, formed on said semiconductor substrate, for covering said semiconductor substrate, said sensing element being disposed in parallel with said fluid stream within said passage and having a sensing portion for generating heat and detecting the temperature thereof, said sensing portion being positioned on a most downstream-side portion of said sensing element with respect to the fluid stream within said passage;

a supporting member for supporting said sensing element in said passage at at least one end of said sensing element; and electric power control means, connected to said sensing portion of said sensing element, for controlling the heat generated therefrom.

* * * * *